(12) United States Patent
De Los Reyes et al.

(10) Patent No.: US 9,015,837 B1
(45) Date of Patent: Apr. 21, 2015

(54) SYSTEMS AND METHODS FOR VERIFYING AN UPDATE TO DATA OF AN ELECTRONIC DEVICE

(75) Inventors: Andrew De Los Reyes, Belmont, CA (US); Darin S. Petkov, Zürich (CH)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 13/249,142

(22) Filed: Sep. 29, 2011

(51) Int. Cl.
G06F 21/00 (2013.01)
G06F 17/40 (2006.01)

(52) U.S. Cl.
CPC ..................................... *G06F 17/40* (2013.01)

(58) Field of Classification Search
USPC ..................................... 717/168–173; 726/23
See application file for complete search history.

(56) References Cited

U.S. PATENT DOCUMENTS

| | | | | |
|---|---|---|---|---|
| 5,008,814 | A * | 4/1991 | Mathur | 709/221 |
| 5,765,172 | A * | 6/1998 | Fox | 1/1 |
| 5,881,236 | A * | 3/1999 | Dickey | 709/221 |
| 6,738,932 | B1 * | 5/2004 | Price | 714/38.11 |
| 2003/0046676 | A1 * | 3/2003 | Cheng et al. | 717/173 |
| 2004/0181790 | A1 * | 9/2004 | Herrick | 717/168 |
| 2008/0098383 | A1 * | 4/2008 | Waldmann | 717/170 |
| 2008/0215796 | A1 * | 9/2008 | Lam et al. | 711/100 |
| 2010/0017459 | A1 * | 1/2010 | Baentsch et al. | 709/203 |
| 2010/0082963 | A1 | 4/2010 | Li et al. | |

OTHER PUBLICATIONS

Wang et al,TaintScope: A Checksum-Aware Directed Fuzzing Tool for Automatic Software Vulnerability Detection, IEEE, 2010, pp. 497-512.*
Bettini et al, Software update via mobile agent based programming, SAC '02 Proceedings of the 2002 ACM symposium on Applied computing , pp. 32-36.*

* cited by examiner

*Primary Examiner* — Bradley Holder
*Assistant Examiner* — Ali Shayanfar
(74) *Attorney, Agent, or Firm* — McDermott Will & Emery LLP

(57) ABSTRACT

Systems and methods for verifying an update to data of an electronic device are provided. A system includes an auto-update module configured to receive an update from an update server over a secured connection. The update is applicable to a first version of the data installed on a source partition. The update includes an expected installation checksum associated with applying the update to the first version of the data. The auto-update module is configured to determine an actual installation checksum associated with a second version of the data installed on a target partition. The second version of the data includes the first version of the data with the update applied thereto. The auto-update module is configured to compare the expected installation checksum to the actual installation checksum, and to verify that the installation of the second version of the data was successful based on the comparison.

15 Claims, 3 Drawing Sheets

SYSTEMS AND METHODS FOR VERIFYING AN UPDATE TO DATA OF AN ELECTRONIC DEVICE

FIELD

The subject technology generally relates to data updates and, in particular, relates to systems and methods for verifying an update to data of an electronic device.

BACKGROUND

When an operating system (OS) running on an electronic device receives updates from an update server, malware or other types of security attacks may compromise this update process. As a result, faulty updates or other undesirable programs may be installed on the electronic device. Thus, it is important to verify that the updates to the OS are the actual intended updates and are correctly installed on the electronic device.

SUMMARY

According to various aspects of the subject technology, an auto-update system for verifying an update to data of an electronic device is provided. The auto-update system comprises an auto-update module configured to receive an update from an update server over a secured connection. The update is applicable to a first version of the data installed on a source partition of the electronic device. The update comprises an expected installation checksum associated with applying the update to the first version of the data. The auto-update module is further configured to determine an actual installation checksum associated with a second version of the data installed on a target partition of the electronic device. The second version of the data comprises the first version of the data with the update applied thereto. The auto-update module is further configured to compare the expected installation checksum to the actual installation checksum, and to verify that the installation of the second version of the data was successful based on the comparison.

According to various aspects of the subject technology, a computer-implemented method for verifying an update to data of an electronic device is provided. The method comprises receiving an update from an update server over a secured connection. The update is applicable to a first version of the data installed on a source partition of the electronic device. The update comprises an expected installation checksum associated with applying the update to the first version of the data. The method also comprises determining an actual installation checksum associated with a second version of the data installed on a target partition of the electronic device. The second version of the data comprises the first version of the data with the update applied thereto. The method also comprises comparing the expected installation checksum to the actual installation checksum. The method also comprises verifying that the installation of the second version of the data was successful based on the comparing step.

According to various aspects of the subject technology, a machine-readable medium encoded with executable instructions for verifying an update to data of an electronic device is provided. The instructions comprise code for maintaining a restricted list of certificate authority certificates on the electronic device. The list contains two or less certificate authority certificates. Each of the two or less certificate authority certificates is associated with a corresponding certificate authority. The instructions also comprise code for receiving a server certificate from an update server. The certificate comprises a signature of a certificate authority corresponding to at least one of the two or less certificate authority certificates. The instructions also comprise code for facilitating establishing a secured connection based on the server certificate. The instructions also comprise code for receiving an update from the update server over the secured connection. The update is applicable to a first version of the data installed on a source partition of the electronic device. The update comprises an expected installation checksum associated with applying the update to the first version of the data. The instructions also comprise code for determining an actual installation checksum associated with a second version of the data installed on a target partition of the electronic device. The second version of the data comprises the first version of the data with the update applied thereto. The instructions also comprise code for comparing the expected installation checksum to the actual installation checksum, and code for verifying that the installation of the second version of the data was successful based on the comparing step.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
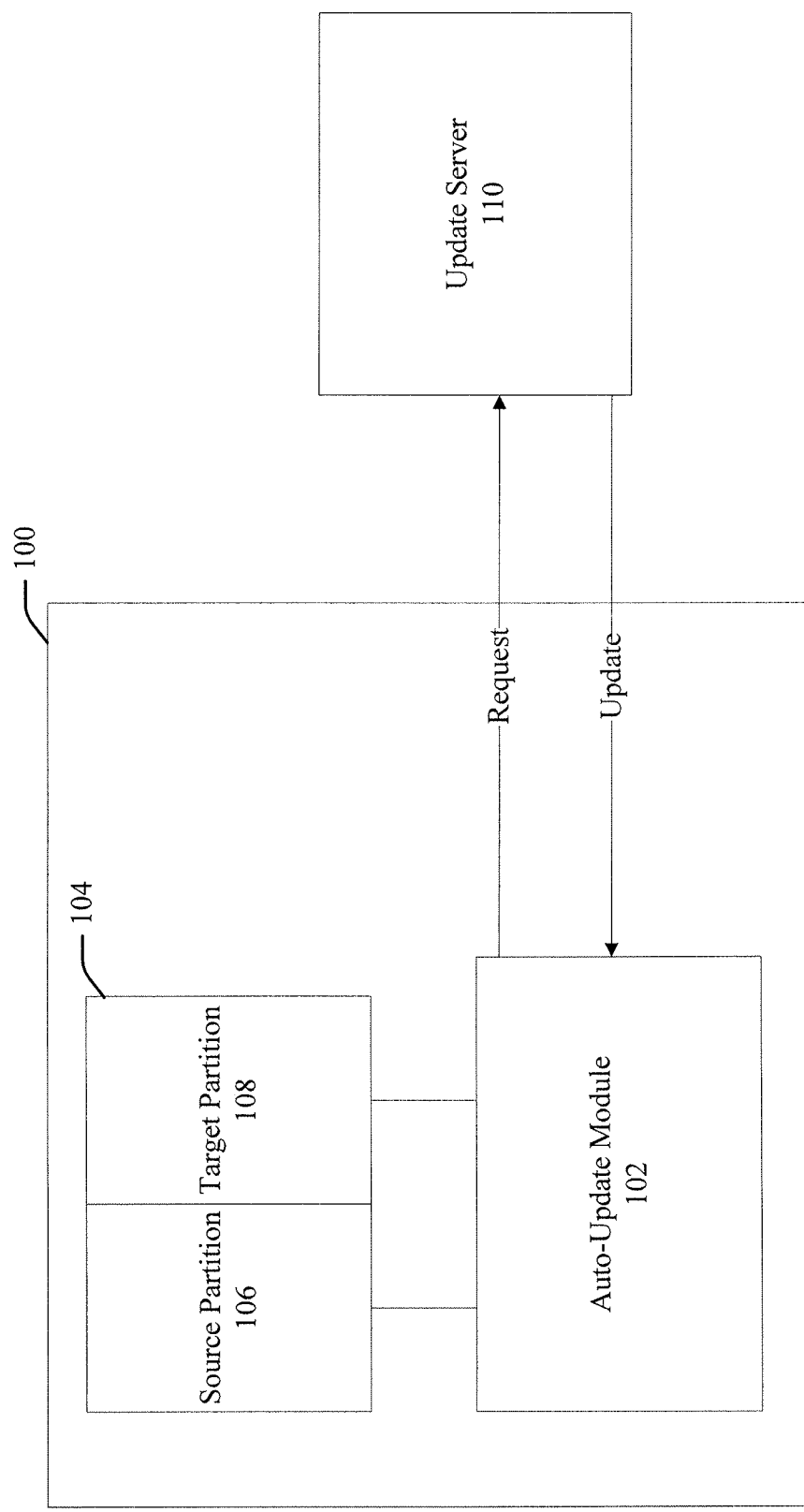
FIG. 1 illustrates an example of a system for verifying an update to data of an electronic device, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to certain aspects of the subject technology, an approach is provided for verifying an update to data of an electronic device. The data may include one or more files stored on the electronic device, an OS running on the electronic device, a database stored on the electronic device, one or more programs running on the electronic device, or other suitable data. The electronic device, for example, may be a desktop computer, a laptop, a notebook, a mobile phone, a tablet, or any other suitable electronic device. In some aspects, the electronic device may correspond to a client that receives an update from an update server. The approach may utilize one or more techniques for verifying that the update received from the update server is the actual intended update.

For example, the uniform resource locator (URL) of the update server may be hard-coded into the electronic device so that an auto-update module of the electronic device may verify that the update server is correct. In some aspects, a secured connection (e.g., a hypertext transfer protocol secure (HTTPS) or secure sockets layer (SSL) connection) may be used to receive the update from the update server. The secured connection, for example, may reduce the risk of malware or other security attacks such as a "rollback" attack. In a rollback attack, an older but otherwise legitimate update containing a known vulnerability may be applied to the client. The secured connection may prevent rollback attacks or other security attacks by making sure that the received update is the actual intended update. In some aspects, the auto-update module may maintain a reduced list of certificate authority certificates on the electronic device, wherein the list contains two or less certificate authority certificates. Thus, only a specific set of certificate authorities may be relied upon to verify a server certificate received from the update server in order to facilitate establishing the secured connection. In some aspects, the signature of a corresponding certificate authority on the server certificate may be used for verification. Other suitable techniques for verifying that the update received from the update server is the actual intended update include verifying the size and/or download checksum of the update itself, encrypting the update, and decrypting the update.

Furthermore, various techniques are provided for verifying that the update is correctly applied to the data. According to certain aspects, the electronic device may comprise storage, such as memory or a hard disk drive (HDD). The storage may be separated into multiple sections. Thus, while a first version of the data (e.g., the data prior to the update) may be stored in one section of the storage and used by a user of the electronic device, a second version of the data (e.g., an updated version of the data compared to the first version) may be installed on another section of the storage without disrupting the user's use of the first version of the data. For example, the data may comprise an operating system (OS) running on the electronic device, and the storage may comprise an HDD having multiple partitions. An auto-update module of the electronic device may receive an update from an update server. The received update may be applicable to a first version of the OS installed and currently running on a source partition of the HDD. After the update is applied, a second version of the OS (comprising the first version of the OS with the update applied thereto) may be installed on a separate target partition of the HDD.

According to various aspects of the subject technology, the installation of the second version of the OS on the target partition may be verified by utilizing installation checksums. For example, the received update may comprise an expected installation checksum that is associated with applying the update to the first version of the OS. In particular, the expected installation checksum may represent a value that is expected when the update to the first version of the OS is successfully applied. The auto-update module may determine an actual installation checksum that is associated with the second version of the OS being installed on the target partition. If the expected installation checksum and the actual installation checksum match, then the auto-update module can verify that the installation of the second version of the OS on the target partition was successful. In some aspects, a verification portion of a boot sequence of the second version of the OS may be simulated to verify that the installation of the second version of the OS was successful.

FIG. 1 illustrates an example of system 100 for verifying an update to data of an electronic device, in accordance with various aspects of the subject technology. System 100 may be part of the electronic device, and may be in communication with update server 110 (e.g., over a network) to receive the update to the data from update server 110. System 100 may comprise auto-update module 102 and storage 104. In the example shown in FIG. 1, storage 104 is a hard disk drive and comprises source partition 106 and target partition 108. Auto-update module 102 may be in communication with source partition 106, target partition 108, and update server 110. In some aspects, auto-update module 102 may be implemented in software (e.g., subroutines and code). In some aspects, auto-update module 102 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of this module according to various aspects of the subject technology are further described in the present disclosure.

Figure 2:
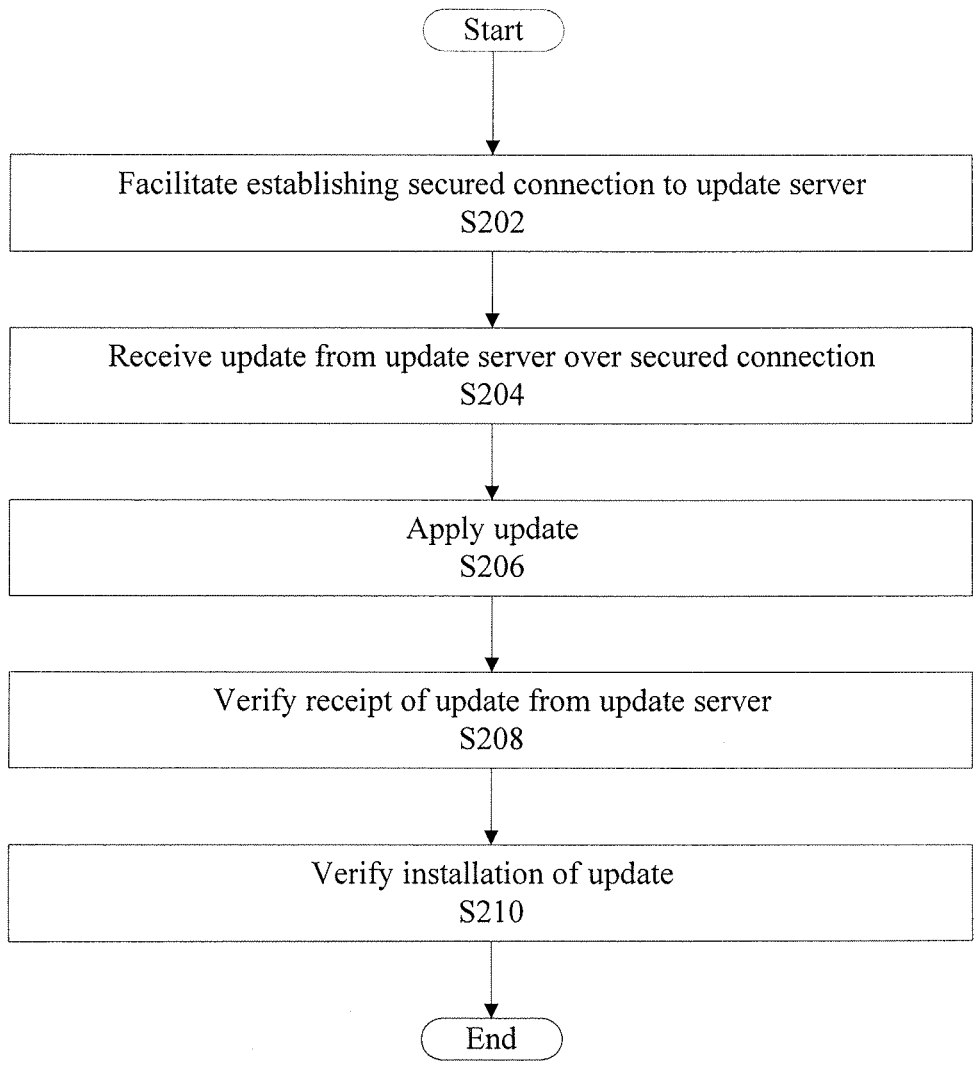
FIG. 2 illustrates an example of a method for verifying an update to data of an electronic device, in accordance with various aspects of the subject technology.

FIG. 2 illustrates an example of method 200 for verifying an update to data of an electronic device, in accordance with various aspects of the subject technology. The update may be applicable to a first version of the data. The data, for example, may comprise an operating system (OS) configured to run on the electronic device. Once the update is applied to the first version of the data, a second version of the data may be generated. Before the update may be applied to the first version of the data, however, a secured connection to update server 110 can be established to ensure that the electronic device receives the actual intended update from update server 110 as opposed to receiving malware from other sources.

According to step S202, auto-update module 102 may facilitate establishing a secured connection to update server 110. In some aspects, a uniform resource locator (URL) of update server 110 may be hard-coded into the electronic device (e.g., a verified partition of the electronic device). Thus, auto-update module 102 may access update server 110 using the URL that is already hard-coded into the electronic device, which may ensure that auto-update module 102 does not receive any malware from other sources at locations that do not match the URL.

In some aspects, the secured connection may be at least one of a secured sockets layer (SSL) connection and a hypertext transfer protocol secure (HTTPS) connection. Auto-update module 102 may receive a server certificate from update server 110 to authenticate the connection to update server 110. This server certificate may comprise a signature of one or more certificate authorities (e.g., trusted entities that assert that the connection to update server 110 is authentic). Auto-update module 102 may facilitate establishing the secured connection to update server 110 by maintaining a restricted list of certificate authority certificates (each of which may be associated with a corresponding certificate authority), and verifying the signature of the one or more certificate authorities contained in the server certificate using the restricted list.

For example, auto-update module 102 may facilitate establishing the secured connection if the signature of a certificate authority in the server certificate is from a certificate authority specified in the restricted list. If none of the signatures of the certificate authorities in the server certificate are from a certificate authority specified in the restricted list, then auto-update module 102 may decline to facilitate establishing the secured connection. In some aspects, the restricted list of certificate authority certificates may contain two or less certificate authority certificates. By minimizing the number of certificate authority certificates in the restricted list, the risk of authenticating a faulty connection can be reduced. In some aspects, the restricted list of certificate authority certificates may even contain a single certificate authority certificate that may be trusted by auto-update module 102. However, the restricted list may contain more than two certificate authority certificates as long as the corresponding certificate authorities may be reasonably trustworthy sources.

Once the secured connection to update server 110 has been established, auto-update module 102 may submit a request to update server 110 for the update to the data. In response, according to step S204, auto-update module 102 may receive the update from update server 110 over the secured connection. According to step S206, auto-update module 102 may apply the update to the data. In some aspects, the update may comprise a plurality of operations, each of which may be immediately applied to the data after being received from update server 110 and before a subsequent operation is received. However, the update may also be applied after all the operations have been received from update server 110. Nevertheless, auto-update module 102 may apply the update to the data, particularly the first version of the data. As discussed above, the first version of the data may be installed on source partition 106. Auto-update module 102, once it has received the update, may apply the update to the first version of the data to generate a second version of the data. For example, the second version of the data may be the data after the update has been applied to the first version. In other words, the second version of the data may comprise the first version of the data with the update applied thereto. Note that the application of the update to the first version of the data is not limited to modifications of the first version of the data, but may also include the addition of new information relative to the first version of the data and/or the replacement of the first version of the data with new information, which can be independent of the contents of the first version of the data, to generate the second version of the data. Auto-update module 102 may install the second version of the data on target partition 108.

According to step S208, auto-update module 102 may verify receipt of the update from update server 110. For example, auto-update module 102 may also receive metadata from update server 110 (e.g., before auto-update module 102 begins to receive the update from update server 110 in step S204). This metadata may be associated with the update and may comprise at least one of a uniform resource locator (URL) of the update, an expected size of the update, and an expected download checksum associated with the update. The metadata may be used to verify that auto-update module 102 successfully received the update from update server 110. Auto-update module 102 may also receive the metadata over the secured connection under the same restrictions as described above with respect to step S202.

According to certain aspects, auto-update module 102 may compute an actual download checksum based on the update received from update server 110, and may compare the actual download checksum to the expected download checksum. Auto-update module 102 may verify that the update was successfully received from update server 110 based on the comparison of the actual download checksum to the expected download checksum. For example, if the actual download checksum matches the expected download checksum, then auto-update module 102 may determine that the update was successfully received from update server 110. If, however, the actual download checksum does not match the expected download checksum, then auto-update module 102 may determine that the update was not successfully received from update server 110.

Auto-update module 102 may verify that the update was successfully received from update server 110 based on other suitable parameters, such as comparing the expected size of the update to an actual size of the update received. For example, auto-update module 102 may compare the actual size of the update to the expected size of the update, and may verify that the update was successfully received from update server 110 based on the comparison of the actual size of the update to the expected size of the update. If the actual size of the update matches the expected size of the update, then auto-update module 102 may determine that the update was successfully received from update server 110. If, however, the actual size of the update does not match the expected size of the update, then auto-update module 102 may determine that the update was not successfully received from update server 110.

According to certain aspects, auto-update module 102 may verify that the update was successfully received from update server 110 by using an expected payload checksum. While the expected download checksum described above is associated with the entire update received from update server 110, the expected payload checksum may be specifically associated with a payload portion of the update. For example, the update may comprise the payload portion and a signature portion. The signature portion may comprise the expected payload checksum. This expected payload checksum may be encrypted to provide further security. Once auto-update module 102 receives the update, auto-update module 102 may verify the signature portion by decrypting the encrypted expected payload checksum using a public key stored on the electronic device. Auto-update module 102 may then determine an actual payload checksum based on the received payload portion. By comparing the actual payload checksum to the decrypted expected payload checksum, auto-update module 102 may verify that the payload portion was successfully received from update server 110. For example, if the actual payload checksum matches the decrypted expected payload checksum, auto-update module 102 may determine that the payload portion was successfully received from update server 110. If, however, the actual payload checksum does not match the decrypted expected payload checksum, auto-update module 102 may determine that the payload portion was not successfully received from update server 110, and therefore, the update itself was not successfully received from update server 110.

According to step S210, auto-update module 102 may verify that the installation of the update was successful using an expected installation checksum. As discussed above, the expected installation checksum may represent a value that is expected when the update to the data is successfully applied. In some aspects, the update may comprise the expected installation checksum. Auto-update module 102 may determine an actual installation checksum associated with the second version of the data installed on target partition 108. Auto-update module 102 may compare the expected installation checksum to the actual installation checksum, and may verify that the installation of the second version of the data was successful based on the comparison. For example, auto-update module 102 may verify that the installation of the second version of the data was successful if the expected installation checksum matches the actual installation checksum. Otherwise, auto-update module 102 may determine that the installation of the second version of the data was not successful.

According to certain aspects, auto-update module 102 may further verify the installation of the second version of the data by simulating a verification portion of a boot sequence. For example, as discussed above, the data may comprise an operating system (OS). Since the second version of the OS is installed on target partition 108, auto-update module 102 may simulate a verification portion of a boot sequence of the second version of the OS on target partition 108. If the second version of the OS is able to boot according to the verification portion of the boot sequence, then auto-update module 102 may determine that the installation of the second version of the OS was successful. If, however, the second version of the OS is not able to boot according to the verification portion of the boot sequence, then auto-update module 102 may determine that the installation of the second version of the OS was not successful.

Figure 3:
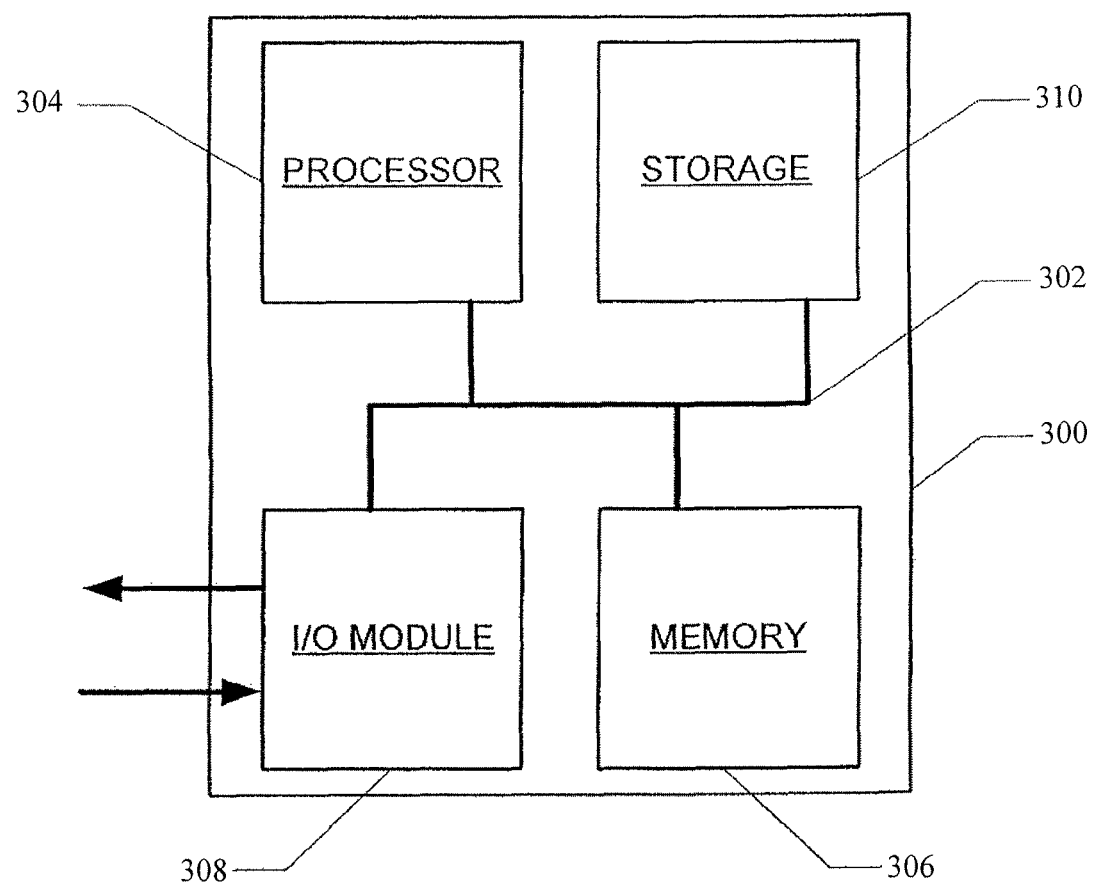
FIG. 3 is a block diagram illustrating components of a controller, in accordance with various aspects of the subject technology.

FIG. 3 is a block diagram illustrating components of controller 300, in accordance with various aspects of the subject technology. Controller 300 comprises processor module 304, storage module 310, input/output (I/O) module 308, memory module 306, and bus 302. Bus 302 may be any suitable communication mechanism for communicating information. Processor module 304, storage module 310, I/O module 308, and memory module 306 are coupled with bus 302 for communicating information between any of the modules of controller 300 and/or information between any module of controller 300 and a device external to controller 300. For example, information communicated between any of the modules of controller 300 may include instructions and/or data. In some aspects, bus 302 may be a universal serial bus. In some aspects, bus 302 may provide Ethernet connectivity.

In some aspects, processor module 304 may comprise one or more processors, where each processor may perform different functions or execute different instructions and/or processes. For example, one or more processors may execute instructions for verifying an update to data of an electronic device (e.g., method 200), and one or more processors may execute instructions for input/output functions.

Memory module 306 may be random access memory ("RAM") or other dynamic storage devices for storing information and instructions to be executed by processor module 304. Memory module 306 may also be used for storing temporary variables or other intermediate information during execution of instructions by processor 304. In some aspects, memory module 306 may comprise battery-powered static RAM, which stores information without requiring power to maintain the stored information. Storage module 310 may be a magnetic disk or optical disk and may also store information and instructions. In some aspects, storage module 310 may comprise hard disk storage or electronic memory storage (e.g., flash memory). In some aspects, memory module 306 and storage module 310 are both a machine-readable medium.

Controller 300 is coupled via I/O module 308 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 300 via I/O module 308 for communicating information and command selections to processor module 304.

According to various aspects of the subject disclosure, methods described herein are executed by controller 300. Specifically, processor module 304 executes one or more sequences of instructions contained in memory module 306 and/or storage module 310. In one example, instructions may be read into memory module 306 from another machine-readable medium, such as storage module 310. In another example, instructions may be read directly into memory module 306 from I/O module 308, for example from an operator of system 100 via the user interface. Execution of the sequences of instructions contained in memory module 306 and/or storage module 310 causes processor module 304 to perform methods to verify an update to data of an electronic device. For example, a computational algorithm for verifying an update to data of an electronic device may be stored in memory module 306 and/or storage module 310 as one or more sequences of instructions. Information such as the first version of the data, the second version of the data, the update, the metadata, the URL of the update server, the restricted list of certificate authority certificates, the actual download checksum, the actual size of the update, the actual payload checksum, the actual installation checksum, and/or other suitable information may be communicated from processor module 304 to memory module 306 and/or storage module 310 via bus 302 for storage. In some aspects, the information may be communicated from processor module 304, memory module 306, and/or storage module 310 to I/O module 308 via bus 302. The information may then be communicated from I/O module 308 to an operator of system 100 via the user interface.

One or more processors in a multi-processing arrangement may also be employed to execute the sequences of instructions contained in memory module 306 and/or storage module 310. In some aspects, hard-wired circuitry may be used in place of or in combination with software instructions to implement various aspects of the subject disclosure. Thus, aspects of the subject disclosure are not limited to any specific combination of hardware circuitry and software. Although the foregoing description of controller 300 describes an operator and a user interface, the data of an electronic device may also be updated automatically without an operator and/or user interface.

The term "machine-readable medium," or "computer-readable medium," as used herein, refers to any medium that participates in providing instructions to processor module 304 for execution. Such a medium may take many forms, including, but not limited to, non-volatile media and volatile media. Non-volatile media include, for example, optical or magnetic disks, such as storage module 310. Volatile media include dynamic memory, such as memory module 306. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. An auto-update system for verifying an update to data of an electronic device, the auto-update system comprising:

memory comprising instructions for verifying the update to the data of the electronic device; and a hardware processor configured to execute the instructions to implement an auto-update module, the auto-update module configured to maintain a restricted list of certificate authority certificates on the electronic device, the restricted list of certificate authority certificates containing two or less certificate authority certificates, each of the two or less certificate authority certificates being associated with a corresponding certificate authority, the auto-update module configured to receive from an update server a server certificate comprising a signature of a certificate authority corresponding to at least one of the two or less certificate authority certificates, the auto-update module configured to establish a secured connection with the update server by verifying the signature of the certificate authority corresponds to at least one of the two or less certificate authority certificates, the auto-update module configured to receive an update from the update server over the secured connection, the update being applicable to a first version of the data installed on a source partition of the electronic device, the update comprising a payload portion and a signature portion, and the signature portion comprising an encrypted expected payload checksum, the auto-update module configured to verify the signature portion by decrypting the encrypted expected payload checksum using a public key stored on the electronic device, the auto-update module configured to apply the update without having to stop running the first version of the data, the update comprising an expected installation checksum associated with applying the update to the first version of the data, the auto-update module configured to determine an actual installation checksum associated with a second version of the data installed on a target partition of the electronic device, the second version of the data comprising the first version of the data with the update applied thereto, and the auto-update module configured to compare the expected installation checksum to the actual installation checksum, and to verify that the installation of the second version of the data was successful based on the comparison.

2. The system of claim 1, wherein a uniform resource locator (URL) of the update server is hard-coded into the electronic device, and wherein the auto-update module is configured to facilitate establishing the secured connection to the update server based on the URL.

3. The system of claim 2, wherein the URL of the update server is hard-coded into a verified partition of the electronic device.

4. The system of claim 1, wherein the secured connection is at least one of a secured sockets layer (SSL) connection and a hypertext transfer protocol secure (HTTPS) connection.

5. The system of claim 1, wherein the auto-update module is configured to receive metadata from the update server, the metadata being associated with the update and comprising at least one of a uniform resource locator (URL) of the update, an expected size of the update, and an expected download checksum.

6. The system of claim 5, wherein the auto-update module is configured to receive the metadata over the secured connection.

7. The system of claim 5, wherein the auto-update module is configured to compute an actual download checksum based on the update received from the update server, to compare the actual download checksum to the expected download checksum, and to verify that the update was successfully received from the update server based on the comparison of the actual download checksum to the expected download checksum.

8. The system of claim 5, wherein the auto-update module is configured to compare an actual size of the update to the expected size of the update, and to verify that the update was successfully received from the update server based on the comparison of the actual size of the update to the expected size of the update.

9. The system of claim 1, wherein the auto-update module is configured to determine an actual payload checksum based on the payload portion, to compare the actual payload checksum to the decrypted expected payload checksum, and to verify that the payload portion was successfully received from the update server based on the comparison between the actual payload checksum and the decrypted expected payload checksum.

10. The system of claim 1, wherein the auto-update module is configured to verify that the installation of the second version of the data was successful if the expected installation checksum is the same as the actual installation checksum.

11. The system of claim 1, wherein the data comprises an operating system (OS).

12. The system of claim 11, wherein the auto-update module is configured to simulate a verification portion of a boot sequence of the second version of the OS installed on the target partition to verify the installation of the second version of the OS.

13. The system of claim 1, wherein the auto-update module is configured to install the second version of the data on the target partition while a user uses the first version of the data installed on a source partition.

14. A computer-implemented method for verifying an update to data of an electronic device, the method comprising:
   maintaining, by the electronic device, a restricted list of certificate authority certificates on the electronic device, the list containing two or less certificate authority certificates, each of the two or less certificate authority certificates being associated with a corresponding certificate authority;
   receiving, by the electronic device, a server certificate from an update server, the server certificate comprising a signature of a certificate authority corresponding to at least one of the two or less certificate authority certificates;
   establishing, by the electronic device, a secured connection with the update server based on the server certificate by verifying the signature of the certificate authority corresponds to at least one of the two or less certificate authority certificates;
   receiving, by the electronic device, an update from the update server over the secured connection, the update being applicable to a first version of the data, the update comprising an expected installation checksum associated with applying the update to a first version of the data, the update comprising a payload portion and a signature portion, and the signature portion comprising an encrypted expected payload checksum;
   verifying, by the electronic device, the signature portion by decrypting the encrypted expected payload checksum using a public key stored on the electronic device;
   applying, by the electronic device, the update without having to stop running the first version of the data;
   determining, by the electronic device, an actual installation checksum associated with a second version of the data installed on a target partition of the electronic device, the second version of the data comprising the first version of the data with the update applied thereto;
   comparing, by the electronic device, the expected installation checksum to the actual installation checksum; and
   verifying, by the electronic device, that the installation of the second version of the data was successful based on the comparing step.

15. A non-transitory machine-readable medium encoded with executable instructions for verifying an update to data of an electronic device, the instructions comprising code for:
   maintaining a restricted list of certificate authority certificates on the electronic device, the list containing two or less certificate authority certificates, each of the two or less certificate authority certificates being associated with a corresponding certificate authority;
   receiving a server certificate from an update server, the server certificate comprising a signature of a certificate authority corresponding to at least one of the two or less certificate authority certificates;
   establishing a secured connection with the update server based on the server certificate by verifying the signature of the certificate authority corresponds to at least one of the two or less certificate authority certificates;
   receiving an update from the update server over the secured connection, the update being applicable to a first version of the data, the update comprising an expected installation checksum associated with applying the update to a first version of the data, the update comprising a payload portion and a signature portion, and the signature portion comprising an encrypted expected payload checksum;
   verifying the signature portion by decrypting the encrypted expected payload checksum using a public key stored on the electronic device;
   applying the update without having to stop running the first version of the data;
   determining an actual installation checksum associated with a second version of the data installed on a target partition of the electronic device, the second version of the data comprising the first version of the data with the update applied thereto;
   comparing the expected installation checksum to the actual installation checksum; and
   verifying that the installation of the second version of the data was successful based on the comparing step.

* * * * *